Oct. 4, 1927. 1,644,537
P. W. MEACHAM
HARVESTING MACHINE
Filed July 12, 1924  2 Sheets-Sheet 1
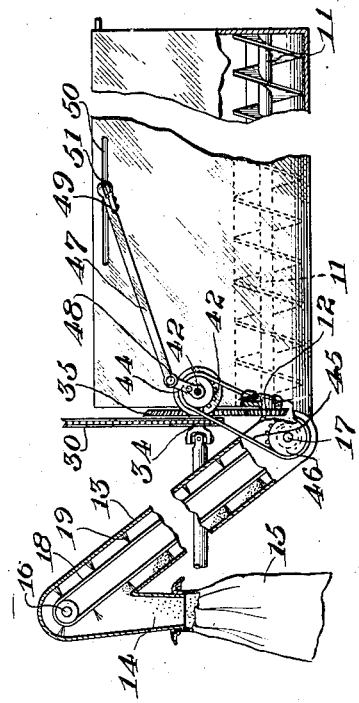
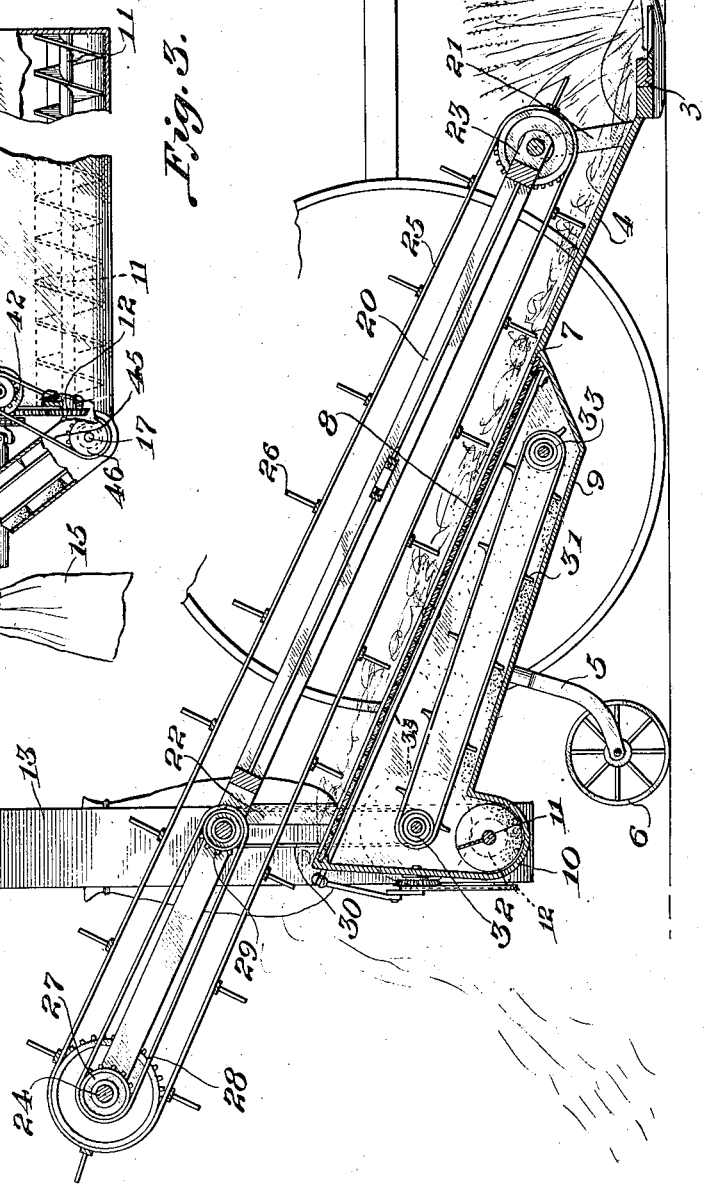
Inventor
P. W. Meacham
By William C. Linton
Attorney

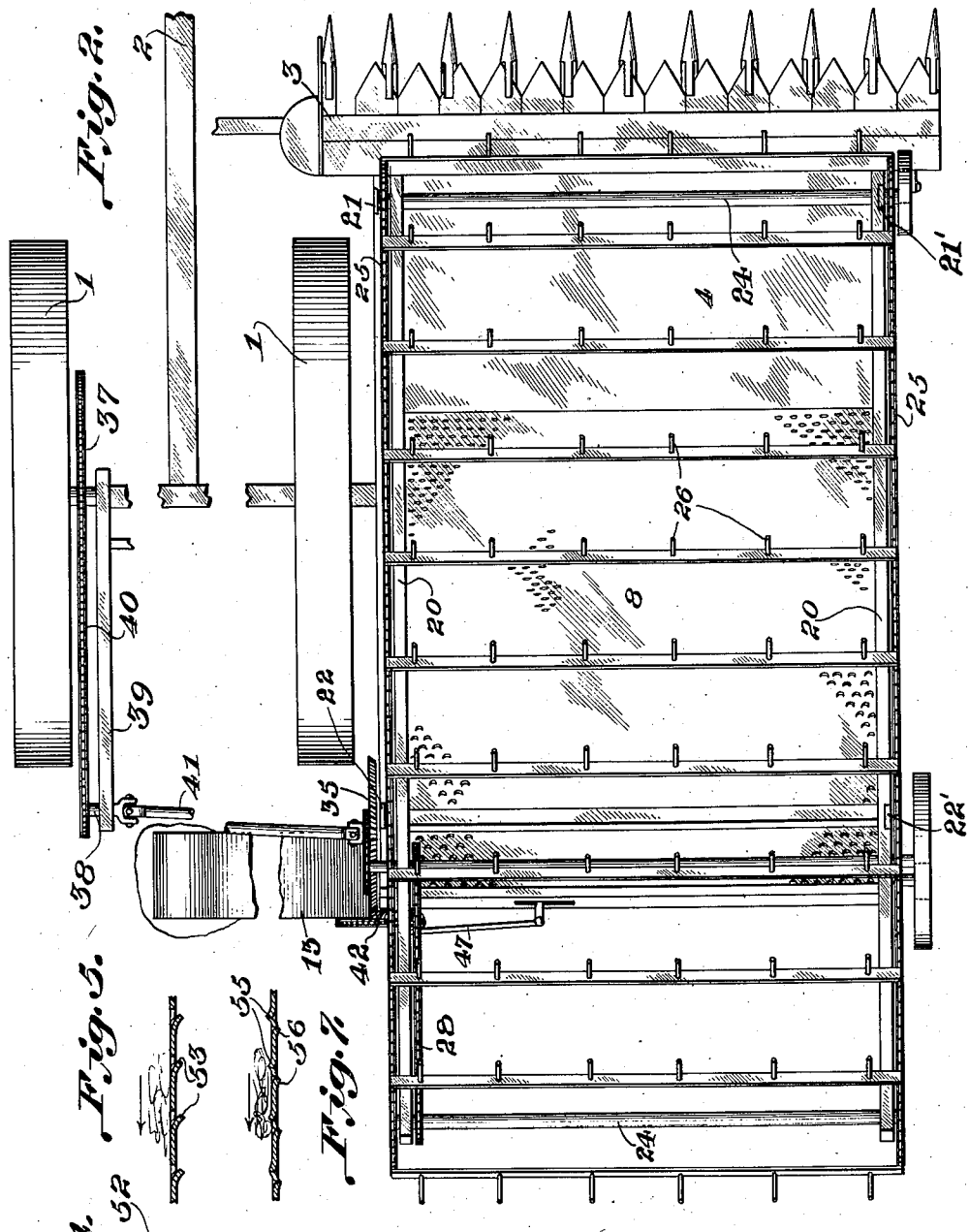

Patented Oct. 4, 1927.

1,644,537

UNITED STATES PATENT OFFICE.

PRESLEY WILEY MEACHAM, OF MONROE, ARKANSAS.

HARVESTING MACHINE.

Application filed July 12, 1924. Serial No. 725,716.

This invention relates to improvements in seed harvesting machines, having for an object to provide a machine for harvesting lespedeza and other seed which scatter when cut by a mower, the machine being capable of positive control or operation without repeated stops by a single attendant and wherein, the seed to be harvested, will with scattering, be gathered without loss or wastage, for conduction onto a separating means, from whence, it will be conveyed into suitable containers.

It is likewise an object of the invention to provide a seed harvesting machine employing a novel form of separator means functioning to thoroughly separate the seed from the chaff and foreign matter, through the medium of a vibratory screening device, whereupon the separated seed will be directed by conveyors for discharge into sacks, or other containers, supported upon the machine.

Another and equally important object of the invention is to provide a harvesting machine deriving power for operation of the conveying and separator means from the running gears thereof during movement of the machine over a field, thus avoiding the necessity of a separate power unit therefor.

Other objects of the invention will be in part obvious, and in part pointed out hereinafter.

In order that the invention and its mode of operation may be readily understood by persons skilled in the art, I have in the accompanying illustrative drawings, and in the detailed following description based thereupon, set out one possible embodiment of the same.

In these drawings:—

Figure 1 is a vertical longitudinal section through the improved seed harvesting machine;

Figure 2 is a plan view of the same showing it in position upon a mower;

Figure 3 is a reduced fragmentary detail, partly in section, showing the manner in which the separated seed is adapted to be conveyed from the separator receptacle, thence by elevating means for discharge into sacks or other containers;

Figure 4 is a fragmentary detail in plan showing one form of screening device employed in connection with the separator means of the harvester;

Figure 5 is a vertical longitudinal section through the same;

Figure 6 is a fragmentary detail in plan of another form of screen for the separator means of the seed harvesting machine; and, Figure 7 is a vertical longitudinal section through the same.

Having more particular reference to the drawings, in connection with which like characters of reference will designate corresponding parts throughout, the improved harvesting machine is adapted to be arranged upon any standard or now prevalent form of mower, although, it will be understood in this connection, that with certain forms or makes of mower-machines, certain modifications with respect to the mode of attaching the harvester thereto will be needed. Herein, for purposes of illustration, I have shown the machine attached to the wheeled type of mower-machines, generally indicated herein by the numeral 1, the usual draft means, fragmentally shown herein and indicated by the numeral 2 extending from the frame forwardly of the mower-machine, as well as the harvester machine, while the mower arm or bar 3 of said mower-machine is arranged forwardly of and parallel to the lower end of the harvester machine body portion, hereinafter more fully described, so that with mowing of the hay from a field, the same will be directed from the mower knives and bar onto said body portion of the harvesting machine.

The improved harvesting machine comprises a body portion 4 disposed longitudinally of the frame 1 and inclined so that the forward end thereof will be arranged adjacent to and communicating with the rearward side of the mower bar 3 in order that the hay cut from a field will be directed thereonto.

To support the body 4 of the harvesting machine, two bearing arms 5 are loosely or pivotally connected to the under side of such body portion and serves to rotatably receive a wheel 6.

A portion of the body 4, rearwardly of the forward lower end thereof, is cut away and as will be noted upon reference to the Figure 1, has channeled guides 7 formed upon certain of the marginal portions thereof whereby to permit of slidable reception of a riddle or screening device 8 therein, such screening device 8 being adapted to have vibratory motion imparted thereto transversely of the body 4. In this connection, it, of course, will be understood that the arrangement of this screening device 8 within the channeled brackets 7 is such as to permit of free sliding or vibratory motion of the same during operation of the harvesting machine, motion transmitting means, hereinafter more fully described, being connected to such screening device.

An inclined receptacle or pan 9 is formed integral with or secured to a portion of the bottom of the body 4 and is positioned adjacent the cut away portion of such body in order that matter passing from the riddle or screening device 8 will drop thereinto. The upper or rearward portion of this pan or receptacle 9 is formed with a transversely disposed pocket 10 receiving a rotatable spiral or screw conveyor 11 therein, the shaft of which has the opposite ends of the same mounted in suitable bearings in the adjacent portion of the side walls of said receptacle 9, while one end of said shaft is extended and has a gear 12 mounted thereupon. The inner end of the pocket or conveyor trough 10 is open and communicates with an inclined elevator housing or casing 13 having a discharge chute or branch 14 communicating with the upper or free end thereof, such chute or branch being vertically disposed and adapted to receive the mouth portion of a sack or other suitable container, indicated by the numeral 15, thereabout, as shown in the Figure 3.

The elevator housing 13 has roller-carrying shafts 16 and 17 disposed transversely of the opposite end portions thereof and mounted in suitable bearings, these rollers receiving an endless belt 18 thereover carrying flexible arms or brushes 19. Thus, with passage of the harvested seed from the conveyor trough 10 into the lower portion of the housing 13, it will be understood that the same will, with rotation of the conveyor belt 18, be gathered by the brushes 19 and elevated upwardly through said housing 13 for discharge by way of the chute 14 into a container 15 communicating therewith.

With a view towards providing means for gathering the hay cut by the mower blade and conveying the same over the bottom of the inclined body 4, a substantially rectangular trussed frame 20 is arranged upon said body 4 having a portion of the forward end thereof supported upon a bracket arm 21 secured to the lower forward portion of the body 4, while the upper inner side thereof is supported upon a spaced bracket arm 22 having the lower portion thereof rigidly secured to the inner side portion of the upper portion of said body 4. The opposite or outer sides of the frame 20 are also supported by the body 4 but in such a manner that the hay may readily pass without being obstructed by the stationary arms. Therefore, the outer side of the frame 20 is supported by the wheels or rollers 21' and 22' as indicated in Figure 2, resting on small rollers attached to the body 4. Rotary motion is applied to the wheels 21' and 22' by reason of their attachment to the frame 20. Thus, as the rollers 21' and 22' rotate, their supporting rollers must rotate in an opposite direction, by friction, making positive anti-drifting supports or standards. Sprocket wheels 23 are mounted upon shafts 24 disposed transversely of the frame 20 and rotatably mounted in suitable bearings thereupon; these sprocket wheels receiving thereover endless sprocket chains 25 carrying thereupon a plurality of equi-spaced raking fingers or teeth 26. A smaller sprocket wheel 27 is fixedly mounted upon an extended end of the upper shaft 24 and receives an endless sprocket chain 28 thereabout, such chain also passing over a power transmitting sprocket wheel 29 mounted in suitable bearings upon an adjacent portion of the frame 20, as clearly shown in Figure 1, the shaft carrying such sprocket wheel having a similar wheel mounted on the same and receiving the upper end of a sprocket chain 30 thereover.

Other conveyor or elevating means are arranged within the separator receptacle 9 and consist of endless chains or belts having raking or gathering fingers 31 arranged thereupon in equi-distant relation; the chains or belts passing over sprocket wheels 32 and 33 mounted upon relatively spaced shafts disposed transversely of the opposite end portions of the receptacle 9 and mounted in suitable bearings provided therein. In this connection, it should be noted that the inner end of the shaft carrying the sprocket wheels 32 is extended for a distance beyond the inner wall of the separator receptacle 9 and has a sprocket wheel 34 fixedly mounted thereon about which the lower end of the power transmitting sprocket chain 30 passes, while a bevel gear 35 is also fixedly mounted upon this extended portion of said shaft and serves for a purpose which will be subsequently described. Normally meshing with the gear 35 carried by the shaft of the sprocket wheels 32 is a bevel gear 12 of the shaft of the spiral or screw conveyor 11 in order that rotary motion may be imparted to the latter with rotation of the sprocket wheels 32.

To permit the transmission of rotary motion to the various active mechanisms of the harvesting machine with movement of a wheeled mower-machine over a field, a sprocket wheel 37 is fixedly mounted upon the wheel supporting and driving shaft of the mower-machine, while a second sprocket wheel is mounted upon a stub-shaft 38 rotatably mounted in suitable bearings upon a bracket arm 39. An endless sprocket chain 40 interconnects the sprocket wheel 37 and the stub-shaft sprocket wheel and in consequence, with rotation of the wheels of the mower-machine, rotary motion will be imparted thereto. This rotary motion is adapted to be transmitted from the stub-shaft 38 by way of a universally jointed coupling shaft 41 to the extended end of the shaft carrying the sprocket wheels 32 and the sprocket wheels 34 and the several gears 35 and 36.

In order that vibratory motion may be imparted to the screening device 8 slidably mounted in the channeled guide brackets 7 provided upon certain portions of the body 4, a stub shaft carrying a bevel gear 42 is rotatably mounted upon a portion of the rearward wall of the separator receptacle 9 and the gear 42 thereof normally meshes with the bevel gear 35, hereinbefore described. This bevel gear 42 is also provided with sprocket wheel teeth 43 and a rigidly mounted arm 44. The sprocket wheel teeth 43 receive the upper end of an endless sprocket chain 45 thereabout, the lower end of such chain passing about a sprocket wheel 46 mounted upon an extended end of the shaft 17 of the elevator housing 13, thus permitting the transmission of rotary motion to the conveying means within such housing 13. A connecting bar or pitman 47 is pivotally connected at one end to the free extremities of the arm 44, as indicated at 48, while a cup-like coupling 49 is arranged upon the remaining end thereof. A horizontally disposed slot 50 is formed in one wall of the separator to accommodate the protruding end of a lever 51 that is connected to the heretofore mentioned pitman 47. This lever has one end pivotally connected to the pan 9 and an intermediate portion pivotally connected to the screen so that in the reciprocatory action of the pitman 47 the lever will be oscillated so as to reciprocate the screen in the channeled guides 7. Attention is called to the fact that the movements of the screen are at right angles to the travel of the conveyor cooperating therewith so that the movements of the screen will in no way interfere with the proper distribution and travel of material over the screen by the conveyor 25.

The screening device 8 preferably consists of a single piece or rigidly joined sections of sheet metal perforated by openings of a size and shape such as will permit the seed from the matter directed thereonto from the mower-arm 3 to pass therethrough into the separator receptacle 9. These openings in the screening device, however, are of such shape or design as will prevent the passage of all other matter therethrough. While these openings may be of different or varying shapes, dependent upon the particular nature or character of seed to be harvested with the machine, I have found it preferable to employ substantially crescent-shaped openings such as indicated generally by the numeral 52 in the Figure 4, the adjacent portions of the screening device 8 being struck downwardly whereby to provide curved tongues generally indicated by the numeral 53. The formation of these openings 52 together with the provision of the downwardly disposed curved tongues 53 is such as will permit the free passage of seed therethrough into the separator receptacle 9 but prevent passage of the hay or other foreign matter through the same, such hay or foreign matter being carried over the screening device 8 by reason of the moving finger or raking teeth 26 of the conveyor chain 25, whereupon the same will be discharged rearwardly of the machine onto the field or other surface being traversed. Also, I have found it practicable to form substantially rectangular openings generally indicated by the numeral 54 in the screening device 8, causing portions on certain sides of said openings to be raised and curved upwardly, as indicated by the numeral 55, while portions upon the opposite sides of said openings are struck downwardly as generally indicated by the numeral 56. Due to this peculiar formation of the openings, and the forming of those portions 54 and 56, the seed will be enabled to pass through such openings, while the hay and other foreign matter will be carried thereover by the longitudinally and rearwardly moving rake 26, whereupon it will be discharged from the rearward end of the machine.

The modus operandi of the invention may be reviewed as follows:—

The improved harvesting machine is especially adapted to be used in connection with any standard form of mower-machine, although it will be understood in this connection that the same may be provided, if desired, with an especially fitted wheeled frame whereby power for operating the various active elements thereof will be derived from the running gear of the same. Assuming, however, that the harvesting machine is to be used in connection with a standard form of mower-machine and that the forward lower end thereof is arranged adjacent and to communicate with the mower arm 3 of such mower-machine, with movement of the apparatus over a field, the blades of the mower arm will function to sever the matter to be harvested, directing the same onto the forward lower end of the body 4 of the harvesting machine. During such movement of the harvesting machine over the field from which matter is to be harvested, it will be understood that rotary motion will be imparted to the active elements thereof, causing rotary movement of the conveyor chain 25, thus causing the rake 26 thereof to move longitudinally and rearwardly over the bottom of the body 4, while vibratory motion is imparted to the screening device 8 through the medium of its connection through the pitman 47 with the universally jointed driving shaft or coupling 41. Similarly, motion is transmitted from the universally jointed or coupling driving shaft 41 to the endless conveyor 31, which by reason of its inter-connection with the spiral conveyor 11 through the gearing 12 and 35, will permit the transmission of rotary motion to the latter; also, rotary motion is directed from the bevel gear 42 through the sprocket chain 45 and wheel 46 to the elevating mechanism within the elevator housing 13. Thus, it will be seen that as the matter cut by the mower blade falls onto the arm 3, it will be engaged by the rearwardly moving rake 26 of the conveyor chain 25 and caused to travel upwardly over the bottom of the body 4 and over the vibrating screening device 8. With cutting and falling of the harvested matter onto the bottom of the body 4, the seed thereof will be scattered and in consequence, with passage of the hay over the screening device 8, it will be understood that the seed will be permitted to pass through the openings 52 or 54 in such screening device into the separator receptacle 9; the hay and foreign matter continuing in its travel over the screening device from whence it will be discharged through the medium of the conveying chains 25 and rake teeth 26 from the rearward end of the harvesting machine. At this point, it should be noted that because of the constant agitation of the cut hay during its passage over the bottom of the body 4 through the medium of the conveyor chain 25 and rake teeth 26, all seed carried thereby will be scattered and in consequence, will pass through the openings of the screening device 8 into the separator receptacle 9. As the separated seed fall into the receptacle 9, they will be gathered by the endless conveyor 31 moving longitudinally in such receptacle 9 and will be directed into the trough 10 receiving the rotating spiral conveyor 11; such conveyor functioning to direct the harvested seed along the transversely disposed trough 10 into the lower portion of the elevator housing 13, from whence the seed will be gathered onto the brushes 19 carried on the moving belts or chains 18 and elevated in said housing to the upper ends thereof from whence it is discharged by way of the chute 14 into the sack or receiving receptacle 15, connected or communicating therewith. As the sack or receiving receptacle is filled, it of course will be understood that a new empty sack or container may be substituted.

From the foregoing, it will be understood that I have provided a harvesting machine especially desirable for use in the harvesting of lespedeza seed, which heretofore could only be harvested or gathered with considerable loss or wastage upon the part of its growers. Also, it will be understood that the scope of usage of the machine is such as to render the same especially advantageous for use in the harvesting of any seed which, with cutting of the hay, will scatter.

Manifestly, the construction shown is capable of considerable modification, and such modification as is within the scope of my claims, I consider within the spirit of my invention.

I claim:—

1. In a grain separating structure a body, a vibratory screen forming a portion of said body, a pan placed directly under said screen and having a pocket forming a continuation of the pan, a conveyor for moving the material from the pan into the pocket, a second conveyor for discharging the material from the pocket, said first conveyor traveling at right angles to the movements of said screen and said second conveyor traveling at right angles to said first conveyor, means for operating said conveyors in unison and a link connection between said means and screen for vibrating the latter.

2. In combination, a pan having a discharge outlet, a screen slidably supported by the pan and forming the top thereof, a conveyor in the pan for moving material to the discharge outlet, a chute communicating with said outlet, a second conveyor in said chute having its lower end arranged at said outlet, power means arranged contiguous to said outlet, interdrive connections between the adjacent ends of said conveyors and said power means, and a reciprocatory connection between said power means and said screen.

In witness whereof I have hereunto set my hand.

PRESLEY WILEY MEACHAM.